United States Patent [19]

Olive et al.

[11] Patent Number: 5,259,153

[45] Date of Patent: Nov. 9, 1993

[54] LIGHT ENERGIZED INSECT TRAP

[76] Inventors: Billy B. Olive, 5815 Mount Sinai Rd., Durham, N.C. 27705; Clarence O. Williams, 3617 Sheffield Dr., Rocky Mount, N.C. 27801

[21] Appl. No.: 934,911

[22] Filed: Aug. 25, 1992

Related U.S. Application Data

[63] Continuation-in-part of Ser. No. 728,533, Jul. 11, 1991, abandoned, which is a continuation-in-part of Ser. No. 554,478, Jul. 19, 1990, abandoned.

[51] Int. Cl.$^5$ .............................................. A01K 1/04
[52] U.S. Cl. ...................................... 43/113; 136/291
[58] Field of Search .................. 43/113, 114; 136/291

[56] References Cited

U.S. PATENT DOCUMENTS

| | | | |
|---|---|---|---|
| 1,322,969 | 11/1919 | Smith | 43/113 |
| 1,521,323 | 12/1924 | Reeder | 43/113 |
| 1,658,589 | 2/1928 | Brady | 43/113 |
| 3,023,539 | 3/1962 | Emerson, Jr. | 43/114 |
| 3,540,145 | 11/1970 | McEwen | 43/113 |
| 3,863,384 | 2/1975 | Weatherston et al. | 43/114 |
| 4,009,535 | 3/1977 | Stock | 136/291 |
| 4,566,220 | 1/1986 | Justice | 43/113 |
| 4,686,789 | 8/1987 | Williams | 43/113 |
| 4,700,506 | 10/1987 | Williams | 43/113 |
| 4,706,410 | 11/1987 | Briese | 43/107 |
| 4,918,856 | 4/1990 | Olive et al. | 43/113 |

Primary Examiner—Mark Rosenbaum
Assistant Examiner—Chuck Y. Mah
Attorney, Agent, or Firm—Olive & Olive

[57] ABSTRACT

An insect trap utilizes an electrically energized light for luring the insects to a trapping device and powers the light from a solar or artificial light powered electric source. The electric source comprises an array of photo-voltaic cells, a rechargeable battery which in the presence of light is caused to be charged and in the absence of light is caused to be discharged.

16 Claims, 3 Drawing Sheets

LIGHT ENERGIZED INSECT TRAP

This is a continuation-in-part of Ser. No. 07/728,533, now abandoned, which is a continuation-in-part of Ser. No. 554,478, now abandoned.

BACKGROUND OF INVENTION

Field of the Invention

The present invention generally relates to insect traps. More specifically, the invention is directed to a trap for luring and exterminating insects, particularly fleas, by use of a solar or light powered light source.

Background of the Invention

It is known in the art of insect traps to utilize an electrically energized light source for attracting insects and a sticky substance beneath the light source for trapping the insects. It has also been known to suspend an electrically energized light source of a selected color beneath a reflective surface and direct the reflective light toward a sticky substance to trap insects. However, all such forms of electrically energized insect traps have the disadvantage of requiring an electric utility power source and the cautions that must accompany the use of any type of electrical utility powered insect trap. An oil lamp has also been used as an insect trap light source but has the disadvantage, among others, of requiring a source of oil and replenishment of the oil or other fuel.

Solar powered lights have been used for various purposes and particularly for outside lights on sidewalks, patios, lawns and the like. A solar powered edge lit, vertical plastic panel with a cutout house number is described in U.S. Pat. No. 4,009,535. The use of solar powered lights eliminates the need for having to energize the lights from the electric utility power source at the place of use and thus eliminates the need for outside wire, extension cords and the like. Outside insect traps incorporating an electrically energized light and which effectively electrocute flying insects attracted to the light have also been known. However, this type of light luring insect trap requires an electric utility power source, gasoline powered generator source or the like for its operation. Another type of electrically powered insect trap is described U.S. Pat. Nos. 4,686,789 and 4,700,506. However, the type of insect trap described in the '789 and '506 patents also requires an electric utility power source or the like. Also, the structure described in these patents is not suitable for supporting the components and weight of a light energized insect trap as taught by the present invention.

In an effort to eliminate the need for dependence on a conventional electrical utility power supply, applicant's prior U.S. Pat. No. 4,918,856 teaches an insect trap which uses a self-contained, radiant light source such as a tritium tube with means for trapping the insects and this has proven successful.

As a further improvement, the present invention has as its object that of providing for the first time known in the state of the art an insect trap which depends on a solar or other light source as a source of electrical energy for operating an insect luring light in a trapping mechanism.

Other objects will become apparent as the description proceeds.

SUMMARY OF THE INVENTION

In accordance with the invention, applicant provides an insect trap of broad application but designed primarily for entrapment and extermination of non-flying, wingless fleas. The insect trap of the invention in one embodiment comprises a sticky liquid or other sticky substance accessible to a source of fleas to be trapped and a light source in the form of a solar or other artificial light energized light source. Various embodiments illustrate various forms of associating the light source with the trapping surface or other trapping mechanism. An unobstructed, planar upper surface of a top cover is used to support a planar array of photo-voltaic cells. The top cover also mounts and supports on an opposite planar surface a rechargeable battery, an exposed and visible lamp, a housing and related circuit components. The photo-voltaic cells are connected to the battery and circuitry through leads which pass through the cover and the cover is made sufficiently strong to support the weight of all such components. The need for an electrical utility or fuel supply for the light source has thus been eliminated and a relatively inexpensive, relatively long-life, self-contained and compact insect trap has been achieved all of which is believed to represent a significant advance in the art.

DETAILED DESCRIPTION OF THE INVENTION

Figure 1:
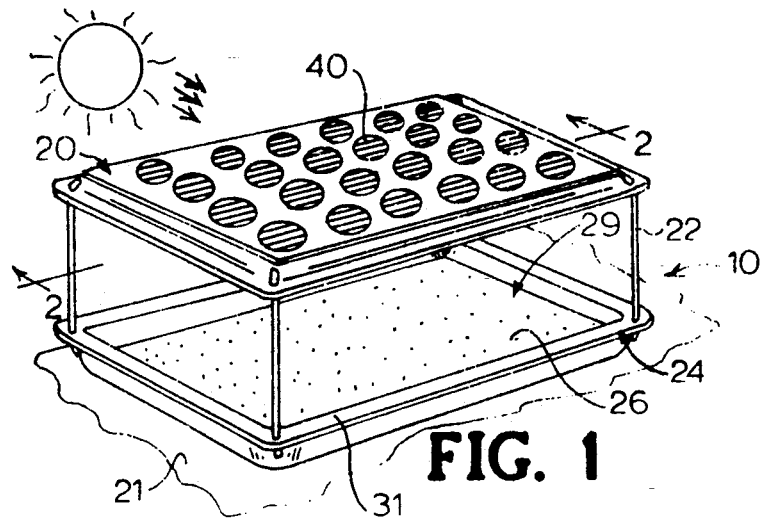
FIG. 1 is a perspective view of a solar powered insect trap suited to trapping non-flying insects according to a first embodiment of the invention.
Figure 2:
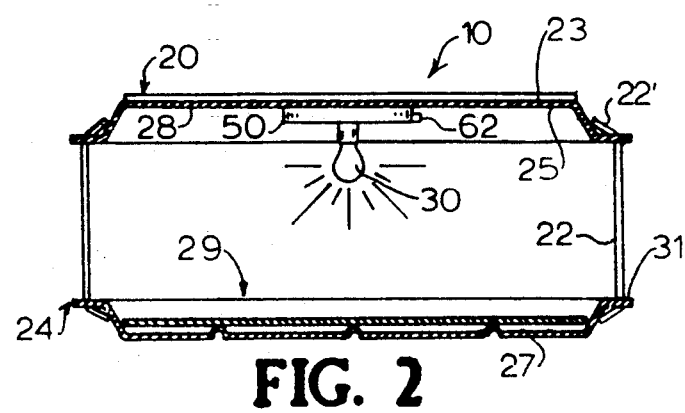
FIG. 2 is an elevational section view taken in the direction of line 2—2 of FIG. 1.

Referring to the drawings, an insect trap 10 constructed in accordance with the first embodiment of the invention as illustrated in FIGS. 1 and 2 comprises a rectangular, top cover 20 formed so as to provide a substantially unobstructed planar horizontal rectangular upper surface 23 suitable for mounting the later described planar array 40 of photo-voltaic cells and a planar horizontal rectangular lower surface 25. Cover 20 is supported by wire formed supports 22 thereby providing four open sides above a shallow, rectangular pan 24 to which supports 22 are secured. Also to be noted is that the upper ends 22' (FIG. 2) of supports 22 terminate below the planar upper surface 23 thus providing an unobstructed planar surface for mounting of the planar array 40 of photo-voltaic cells. Also to be noted is that according to the invention, cover 20 is stamped of relatively heavy gauge sheet metal, molded or otherwise made sufficiently strong to support the combined and entire weight of the power source 44, rechargeable battery 60, lamp 30 and its socket, the circuitry components of circuitry 46 and the housing 50. This combined weight in the commercial form of the invention in which a pair of D-size rechargeable batteries may be employed is anticipated to be in the range of about one and one-half to two pounds as compared to the weight of approximately one ounce were only a lamp and socket of about one ounce weight to be supported as in the referred to '789 and '506 patents.

Pan 24 of substantially the same size as cover 20 contains a replaceable planar sheet of sticky flypaper 26 or the like supported on a substantially planar, horizontal surface 27. U.S. Pat. No. 4,686,789 may be referred to for a type of portable shallow pan-cover-support configuration. However, the upper surface of the top cover of the '789 patent is interrupted by support legs and the top cover is otherwise generally not suited except with modification to the unique solar power arrangement and requirements of the present invention.

The planar lower surface 25 of cover 20 comprises an inner or lower reflective planar surface 28 of suitable color, preferably green for fleas, so as to reflect and supplement the radiated light produced by the solar or artificial light powered lamp 30 towards the trapping surface 26. In use, the shallow pan 24 resting on the floor 21 enables any fleas on floor 21 to sense both the radiated and reflected light and jump toward the lamp 30 to be trapped by the trapping surface 26. Lamp 30 is preferably also of a green color for trapping fleas.

Figure 3:
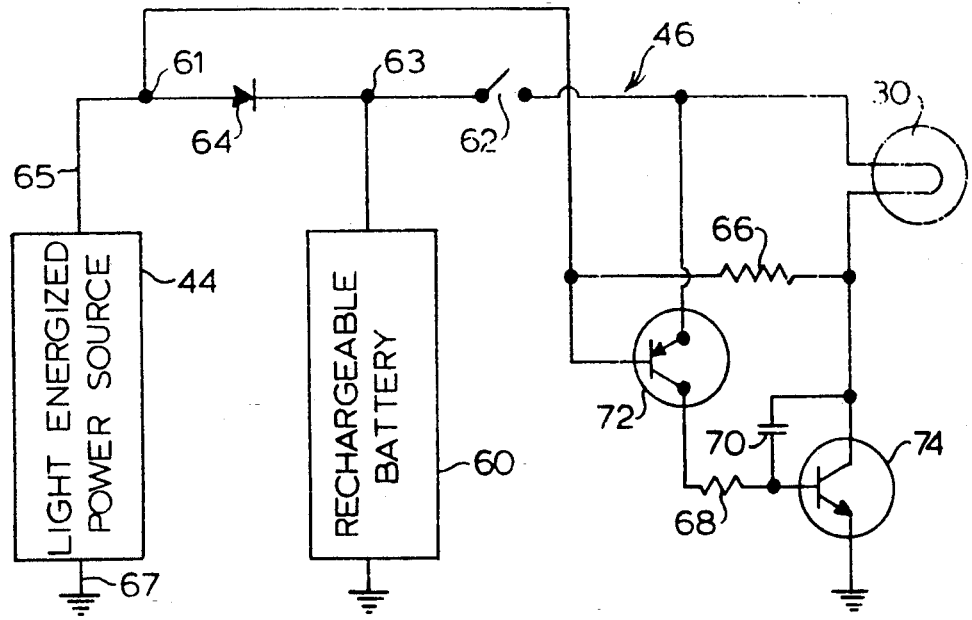
FIG. 3 is a diagram of an electric circuit employed in the invention.

As previously mentioned, the lamp 30 is energized by a battery charged by a solar energy or an artificial light source and in this regard, a plurality of photo-voltaic cells in a planar, generally rectangular array 40 are mounted on top of the unobstructed planar upper surface 23 of cover 20 and are connected to form a light energized power source 44 as part of the circuitry 46 seen in FIG. 3. Circuitry 46, except for the planar array of photo-voltaic cells 40, is housed in the centrally mounted housing 50 suitably detachably secured to the planar lower surface 25 of cover 20 above lamp 30 as best seen in FIG. 2 and provides the means for energizing lamp 30. Circuitry 46 as seen in FIG. 3 further includes a rechargeable battery or set of batteries 60, a single pole, single throw manual switch 62 suitably mounted on housing 50 (FIG. 2), a rectifier 64, fixed resistors 66, 68, a capacitor 70, a PNP transistor 72, a NPN transistor 74 and the previously mentioned lamp 30. The power source 44 is connected to the circuitry through leads 65, 67 (FIG. 3) which pass through a suitable formed hole (not shown) in cover 20.

Cover 20, as previously mentioned, is made sufficiently strong to support the combined and relatively heavy weight of the planar array 40, battery or batteries 60, lamp 30 and its socket housing 50 and all the circuitry components of circuitry 46. In a preferred embodiment, cover 20 is stamped from a relatively heavy gauge metal as a single piece and pan 22 is stamped of a lighter gauge metal.

The described system has a solar energized power source, a rechargeable battery, and a lamp as illustrated, all of which are supported by cover 20. During the sunny hours, the rechargeable battery is re-charged, and the lamp is automatically turned on assuming that switch 62 is closed. However, switch 62 may be switched open and all of the light energy used to charge the rechargeable battery 60.

During sunny hours and with continuing reference to FIG. 3, the voltage of the light energized power source, i.e. panel 44, is more than the voltage of the rechargeable battery 60 by enough to overcome the forward drop of rectifier 64. This allows current to flow directly from the light energized power source 44, to the rechargeable battery 60. At this time, the voltage at point 61 is more than that at point 63. Point 61 is seen as being connected to the base of PNP transistor 72, and assuming switch 62 is closed, point 63 is seen as being connected to its emitter. This causes transistor 72 to be cut off. Since NPN transistor 74 may only obtain base current from transistor 72, it is also cut off during this state. Lamp 30 may only conduct through transistor 74 therefore it is turned off in this state.

During the dark hours and with further reference to FIG. 3, the voltage of the light energized power source 44 is less than that of the rechargeable battery 60. This causes rectifier 64 to be back-biased. Therefore, essentially no current may flow from the rechargeable battery 60 to the light energized power source 44. The voltage at point 63 is now more than the voltage at point 61. This causes the base of transistor 72 to be less positive than its emitter. Transistor 72 therefore goes into conduction. The collector current of transistor 72 flows, through resistor 68, to the base of transistor 74. This causes transistor 74 to conduct, bringing the voltage at its collector downward. This downward shift of voltage at the collector of transistor 74 is coupled back to the base of transistor 72 through resistor 66. This further increases the conduction of transistor 72, and thus also that of transistor 74. This positive feedback will quickly turn on transistor 74 until it is fully conducting so that there is very little voltage from the collector to the emitter of transistor 74, and most of the voltage of battery 60 is across lamp 30. This causes lamp 30 to become fully on.

Capacitor 70 is used to eliminate troublesome parasitic oscillations that are sometimes present in positive feedback circuits of the type described.

In use, the rechargeable battery 60 is charged from solar or other light energy utilizing the circuitry 46 and during which switch 62 may be open. At night or during other periods when lamp 30 can be seen, the trap 10 is placed on the floor 21 where fleas or other insects are trapped by being lured to the lamp 30 and being caught by passage through the planar entrance 29 defined by upper peripheral edges 31 on pan 24 and leading to the sticky surface 26.

While switch 62 has been described as a manual switch, it could also assume the form of being a photo-cell switch which closes in the absence of light at night and opens during the day in the presence of light.

Figure 4:
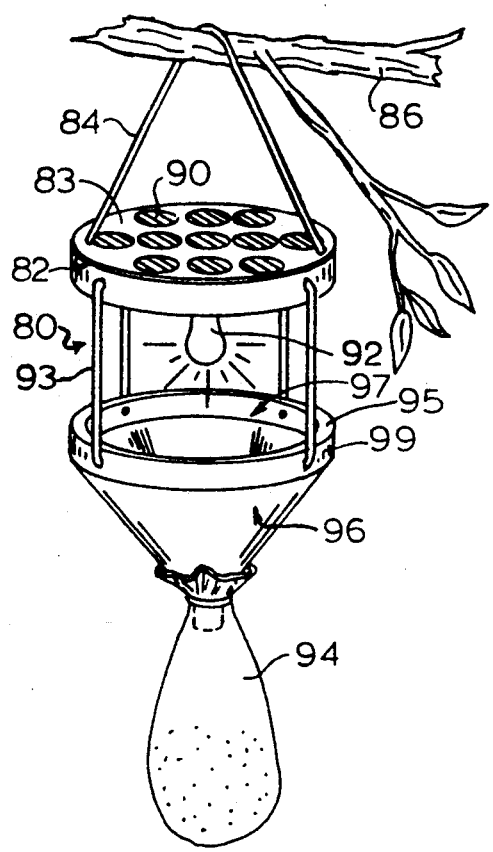
FIG. 4 is a perspective view of a suspended solar powered insect trap suited to trapping flying insects in a bag according to a second embodiment of the invention.

In a second embodiment illustrated in FIG. 4, an insect trap 80 utilizes a round cover 82 suspended by support 84 from a limb 86 or the like. Cover 82 mounts on an unobstructed, horizontal planar upper surface 83 a planar array of photo-voltaic cells 90 for energizing the illustrated lamp 92 supported on a planar, horizontal, lower surface 93 (not shown) of cover 82 in the manner previously explained. The leads, not shown, connecting the photo-voltaic cells to the circuitry are passed through a hole, not shown, formed in cover 82 as previously described. Other electrical and housing components are as previously explained. In this second embodiment, the rods 93 support a smooth surfaced funnel 96 defining with its peripheral top surface 95 a planar entrance 97 below lamp 92 to the spout of which is detachably attached an insect collecting bag 94. In operation, flying insects are attracted to lamp 92 and are trapped by falling through the planar entrance 97 formed by funnel wall 99 into funnel 96 and into its bag 94. As with the first embodiment, cover 82 is made sufficiently strong to support the combined weight of the light energized power source 44, rechargeable battery or batteries 60, lamp 30, components of the circuitry 46 and housing 50 all of which, though not illustrated in FIG. 4, are employed in the second embodiment. Additionally, cover 82 is made sufficiently strong to support the weight of the rods 93, funnel 96 and bag 94.

Figure 5:
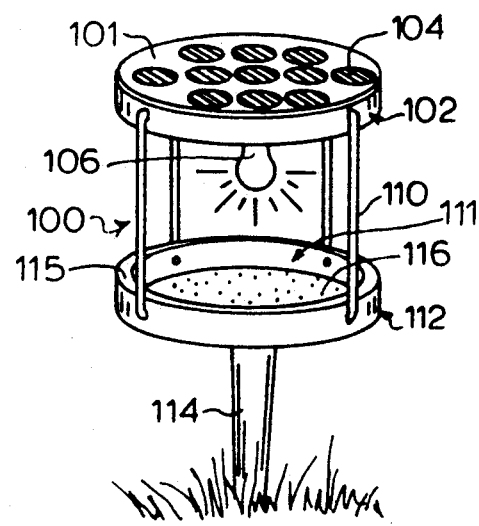
FIG. 5 is a perspective view of a ground supported solar powered insect trap suited to trapping flying insects with a sticky surface according to a third embodiment of the invention.

In a third embodiment illustrated in FIG. 5, the flying insect trap 100 incorporates a top cover 102 having an unobstructed, planar, horizontal upper surface 101 on which a horizontal, planar array of photo-voltaic cells 104 connected as previously described is mounted for the purpose of energizing lamp 106 supported on a planar, horizontal lower surface 103 (not shown) of cover 102 in the manner previously explained. Cover 102 is supported by rods 110 on a pan 112 which in turn is supported on a ground stake 114. Cover 102 is made sufficiently strong to support all of the components of FIG. 3 and the housing 50, not shown in FIG. 5, in the manner previously explained. The upper peripheral surface 115 of the sidewall of pan 112 defines a planar entrance 111 to a replaceable piece of planar sticky flypaper 116 supported on a flat bottom wall 117 (not shown) of pan 112 and which provides a planar trapping surface.

Figure 6:
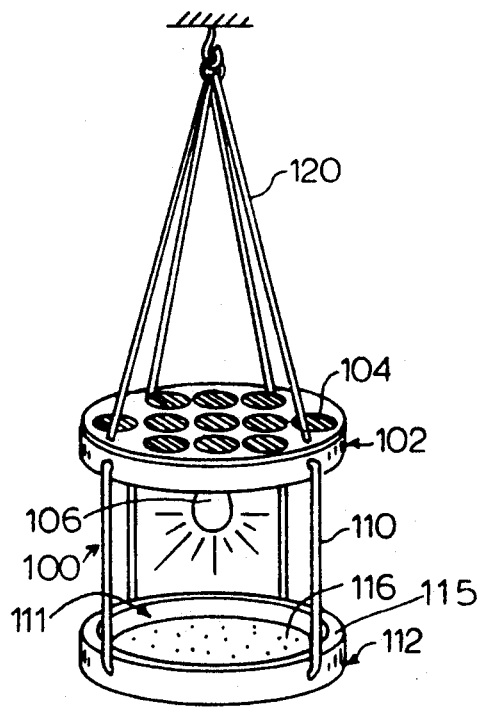
FIG. 6 is a perspective view of a suspended solar powered insect trap suited to trapping flying insects with a sticky surface according to a fourth embodiment of the invention.

In a fourth embodiment illustrated in FIG. 6, and similar to that illustrated in FIG. 5, the insect trap 100 of FIG. 5 is suspended by supports 120 but otherwise is constructed and operates in the manner of the previously explained third embodiment.

Figure 7:
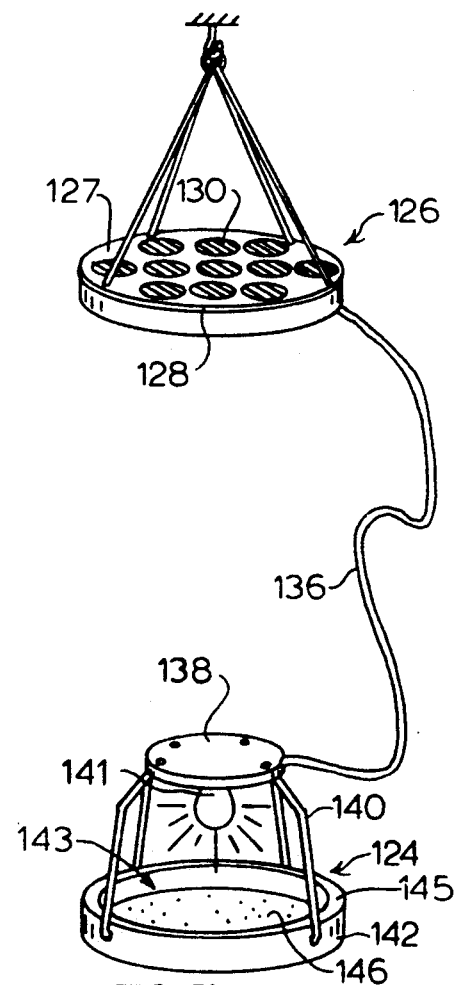
FIG. 7 is a perspective view of a solar powered insect trap suited to trapping non-flying insects according to a fifth embodiment of the invention in which the light energized power source is located at a position remote from the position of the insect trapping apparatus.

In a fifth embodiment illustrated in FIG. 7, the insect trap is separate from the photo-voltaic cell support 126 comprising a suitable support 128 on which a planar, horizontal array of photo-voltaic cells 130 is mounted on a planar, unobstructed, horizontal upper surface 127 of support 128 to form the light energized power source 44 of FIG. 3. An electrical cable 136, corresponding to conductors 65, 67 (FIG. 3) in the circuit 46 connects the light energized power source 44 formed by the planar array of photo-voltaic cells 130 to the circuit 46. The trap 124 otherwise comprises a top plate 138 connected through support rods 140 to a pan 142 having a planar, horizontal insect trapping surface 146 as previously discussed. The circuitry of FIG. 3 except for the light energized power source 44 is mounted below support 128 and otherwise operates as previously explained. Top plate 138 provides a planar, horizontal lower surface 139 (not shown) below which lamp 141 is suspended and which is located above the planar entrance 143 defined by the upper, horizontal peripheral surface 145 of the sidewall of pan 142 and leading to the planar, horizontal trapping surface 146 formed of sticky paper or the like as previously referred to. While illustrated in a form suited to non-flying insects, it is to be recognized that the trap 124 could be oriented at an angle or supported with the trapping surface vertical for trapping flying insects and various others of the surfaces heretofore referred to as being horizontal could assume other orientations consistent with the teachings of the invention.

Figure 8:
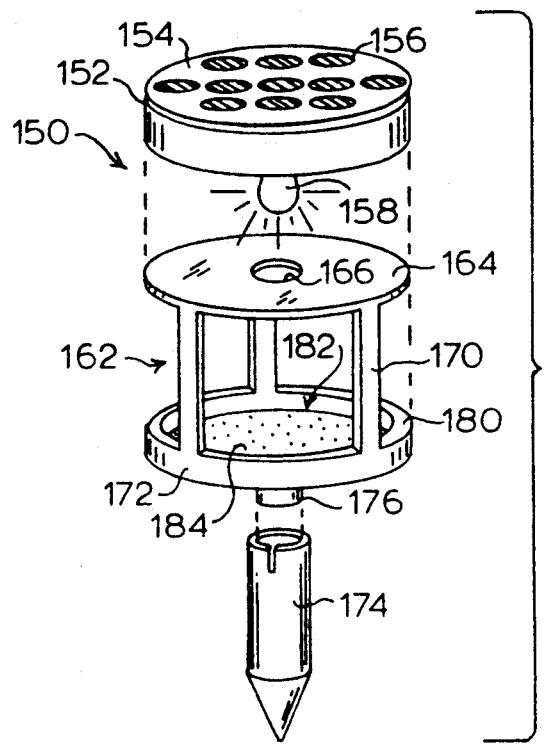
FIG. 8 is a perspective exploded view of a ground support solar powered insect trap representing a modification of the FIG. 5 trap and suited to trapping either flying or non-flying insects according to a sixth embodiment of the invention.
Figure 9:
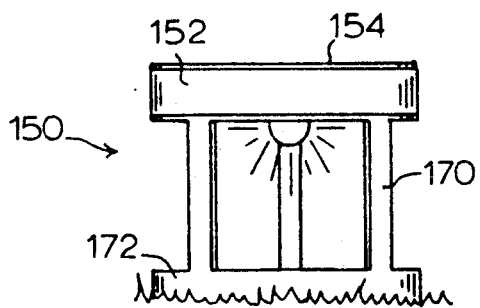
FIG. 9 is an elevation view of the FIG. 8 trap with the supporting stake removed and resting on the ground.
Figure 10:
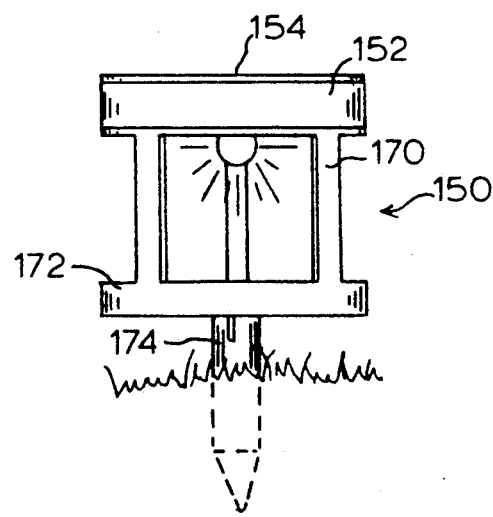
FIG. 10 is an elevation view of the FIG. 8 trap with the supporting stake installed so as to support the trap relatively low to the ground.

In a sixth embodiment illustrated in FIGS. 8-10, the flying insect trap 150 incorporates a removable, round molded or otherwise suitably formed top cover 152 having an unobstructed, planar, horizontal upper surface 154 on which a planar array of photo-voltaic cell 156 is mounted for the purpose of energizing lamp 158 supported on a planar, horizontal lower surface 160 (not shown) of cover 152 in the manner previously explained. Cover 152 is detachably supported by and on an integrally molded or otherwise suitably formed trap member 162 having a top plate member 164, a lamp receiving aperture 166 and support struts 170, which connect cover 152 to a shallow pan 172 which in turn is supported on a ground stake 174. Stake 174 removably receives a molded stake stub 176 integrally and centrally formed on pan 172. The sixth embodiment flea trap 150 can thus be used either in the manner of FIG. 9 in which pan 172 rests on the ground with stub 176 pressed into the ground or inserted into stake 174 so as to elevate trap 150 as in FIG. 10. The upper peripheral surface 180 of the sidewall of pan 172 defines a planar, horizontal entrance 182 to a replaceable piece of planar sticky flypaper 184 supported on a flat, horizontal bottom wall 186 (not shown) of pan 172 and which provides a planar, horizontal trapping surface.

While illustrated as a plurality of photo-voltaic cells, it will be appreciated that the photo-voltaic cell means may be in the form of plural cells as illustrated or in the form of a single integrated panel.

Also to be noted is that the surface area provided by the respective upper surface on which the photo-voltaic cells are mounted and the photo-voltaic cells themselves must be sufficiently large to provide a charging capacity sufficient to operate the lamp with sufficient brightness during hours of darkness and at least over a period of several hours. In this same regard, the lamp wattage is selected to insure this period of operation.

In all of the illustrated embodiments of the invention, there are effectively three uniquely arranged planar means including a first planar means on which the photo-voltaic cells are supported, a second planar means on which the light source is supported and a third planar means forming a peripheral entry to the means for trapping the insects. All of the illustrated embodiments of FIGS. 1-5 and 8-10 are also characterized in that the planar array of photo-voltaic cells are supported on an upper side of a cover which also supported in an opposite position on a lower side of the cover the rechargeable battery, lamp and circuitry with the necessary electrical connection being made through the cover. In all embodiments, the lamp is exposed, directs its light downwardly and outwardly in all directions and is supported immediately above the third planar and trapping means. An extremely compact trap is thus achieved.

In all embodiments, it can also be seen that the need for an electric utility power source has been eliminated and a self-contained, self-powered, light-energized insect trap has been provided.

What is claimed is:

1. A self-powered, self-contained trap for catching insects during hours of darkness independent of a combustible fuel or electrical utility power supply, having a first horizontal, a second horizontal and a third horizontal planar means, and comprising:

(a) assembly means providing a horizontally disposed arrangement including said first horizontal and said second horizontal planar means;

(b) the said first horizontal planar means including a planar horizontal upper surface and the second said planar means including a planar horizontal lower surface;

(c) a trap means including both means for trapping and holding insects and said third horizontal planar means;

(d) said third horizontal planar means comprising a horizontally disposed peripheral entry to said means for trapping insects;

(e) means structurally interconnecting said second horizontal and third horizontal planar means in spaced apart parallel relationship with the space therebetween being open and with said lower horizontal surface of said second horizontal planar means residing above said third horizontal planar means;

(f) a compact, self-contained, light-energized, rechargeable electric power source operative independent of a combustible fuel or electrical utility power source and including a rechargeable battery which in the presence of light is caused to be charged and in the absence of light is caused to be discharged, said power source including all parts thereof being carried and supported by said assembly means, said power source being sufficiently small in size and weight to permit and said assembly means being formed so as to provide such support;

(g) an array of photo-voltaic cell means comprising part of said self-contained, light-energized, rechargeable power source and being the sole part of said power source disposed in planar disposition facing upward on and being of substantially the same size as said horizontal planar upper surface of said first horizontal planar means and having electrical connecting means passing through said assembly means;

(h) an electrically-energized visibly exposed, uncovered light source carried and supported by said assembly means under said second horizontal planar means in close proximity to said planar lower horizontal surface and productive when energized of an outwardly visible, downwardly and outwardly directed luring color of light uniquely suited to attracting the insects to be trapped said light source being of sufficiently low power to permit being energized by said battery;

(i) electric circuit means carried and supported by said assembly means connected between said light-energized, rechargeable electric power source and said visibly exposed light source and operative during hours of darkness for connecting said light-energized, rechargeable electric power source when charged to said visibly exposed light source to energize said visibly exposed light source to provide a said visible luring color of light;

(j) means for supporting said assembly means including said light-energized, rechargeable electric power source visibly exposed light source and electric circuit means near an area having insects to be trapped and in a manner enabling light generated by said visibly exposed light source to be visible to said insects and providing for said visibly exposed light source to be supported at an elevation suited to the nature of such insects; and (k) the surface area of said upper surface being of sufficient size to accommodate a said array of photo-voltaic cell means having sufficient charging capacity to ensure the operation of said lamp with sufficient brightness to attract said insects over a period of at least several hours of darkness.

2. A trap for catching insects as claimed in claim 1 wherein said means for supporting said assembly means including said light-energized, rechargeable electric power source visibly exposed light source and electric circuit means also supports said means for trapping and holding said insects.

3. An insect trap as claimed in claim 1 wherein said means for supporting said assembly means including said light-energized, rechargeable electric power source, visibly exposed light source and electric circuit means supports both said visibly exposed light source and said means for trapping and holding said insects at an elevation suited to flying insects.

4. A trap for catching insects as claimed in claim 1 wherein said means for trapping and holding said insects comprises a sticky landing surface and support means therefor.

5. A trap for catching insects as claimed in claim 1 wherein said insects comprise wingless, non-flying insects, said luring color is a color attractive to said wingless, non-flying insects and said means to support said sticky landing surface makes said sticky landing surface accessible to said wingless, non-flying insects.

6. A trap for catching insects as claimed in claim 1 wherein said assembly means comprises a cover member, said trap means comprises a shallow pan disposed below and opposite said cover member and of substantially equal size, said means structurally interconnecting said second horizontal and third horizontal planar means comprises support members connecting said shallow pan and cover member in a manner whereby not to obstruct said first horizontal and second horizontal planar means and said means for trapping said insects comprises a sticky landing surface formed in said pans.

7. A trap for catching insects as claimed in claim 6 wherein said cover member and pan are of rectangular shape.

8. A trap for catching insects as claimed in claim 6 wherein said cover member and pan are of circular shape.

9. A self-powered, self-contained trap for catching insects during hours of darkness independent of a combustible fuel or electrical utility power supply, having a first, a second and a third planar means, and comprising:

(a) assembly means providing a horizontally disposed arrangement including said first planar means;

(b) said first planar means including a first planar upper surface and the second said planar means including a second planar surface;

(c) a trap means including both means for trapping and holding insects and said third planar means;

(d) said third planar means comprising a peripheral entry to said means for trapping insects;

(e) means structurally interconnecting said second and third planar means in spaced apart parallel relationship and with said second planar surface of said second planar means opposite said third planar means;

(f) a compact, self-contained, light-energized rechargeable electric power source operative independent of a combustible fuel or electrical utility power source and in the presence of light to be charged and in the absence of light to be discharged and being sufficiently small in size and weight so as to be carried by said assembly means;

(g) an array of photo-voltaic cell means comprising part of said self-contained light-energized rechargeable power source and being the sole part of said power source disposed in planar disposition facing upward on and being of substantially the same size as said planar upper surface of said first planar means and having electrical connecting means passing through said assembly means;

(h) an electrically-energized visibly exposed, uncovered light source carried by said second planar means in close proximity to said second planar surface and productive when energized of an outwardly visible luring color of light uniquely suited to attracting the insects to be trapped, said light source being of sufficiently lower power to permit being energized by said power source;

(i) electric circuit means connected between said power source and said light source operative during hours of darkness for connecting said power source when charged to said light source to energize said light source to provide a said luring color or light;

(j) means for supporting said power source and light source near an area having insects to be trapped and in a manner enabling light generated by said light source to be visible to said insects and providing that said light source is supported at an elevation suited to the nature of such insects; and (k) the surface area of said upper surface being of sufficient size to accommodate a said array of photo-voltaic cell means having sufficient charging capacity to ensure the operation of said lamp with sufficient brightness to attract said insects over a period of at least several hours of darkness.

10. A self-powered, self-contained insect trap for catching insects during hours of darkness, comprising:

(a) a first assembly having:
  (i) a cover providing opposed outer and inner planar surfaces;
  (ii) a planar array of photo-voltaic cell means mounted on an substantially covering said outer planar surface and having connecting electrical leads passing through said cover;
  (iii) a rechargeable battery circuit including a rechargeable battery of sufficiently small size and weight to permit being secured within and being secured within a housing mounted on and centrally of said inner planar surface for support by said cover and connected through said leads for being powered by said cell means; and
  (iv) a lamp connected to be and of sufficiently low power to permit being energized by said rechargeable battery circuit supported centrally of said inner planar surface below said housing;

(b) a second assembly formed and arranged to support said first assembly in a manner enabling light from said lamp to be seen by insects sought to be trapped and including means proximate said lamp to trap insects;

(c) support means adapted to support said second assembly whereby to maintain said lamp at an elevation suited to the nature of the insects to be trapped; and (d) the surface area of said outer surface being of sufficient size to accommodate a said array of photo-voltaic cell means having sufficient charging capacity to ensure the operation of said lamp with sufficient brightness to attract said insects over a period of at least several hours of darkness.

11. A self-powered, self-contained insect trap as claimed in claim 10 wherein said first assembly, second assembly and support means are detachably connected.

12. A self-powered, self-contained insect trap as claimed in claim 10 wherein said cover, second assembly and support means are formed as molded interconnectable pieces.

13. A self-powered, self-contained insect trap as claimed in claim 10 wherein said support member includes a stake member detachably connectable to a lower portion of said second assembly.

14. A self-powered, self-contained insect trap as claimed in claim 10 wherein said second assembly includes a bottom shallow pan portion having a replaceable sticky landing surface means supported therein.

15. A self-powered, self-contained insect trap for catching insects during hours of darkness, comprising:

(a) a first assembly having:
  (i) an outer planar surface;
  (ii) a planar array of photo-voltaic cell means mounted on and substantially covering said outer planar surface;
  (iii) a rechargeable battery circuit including a rechargeable battery supported proximate said cell means and connected through leads for being powered by said cell means; and
  (iv) a lamp connected to be and of sufficiently low power to permit being and being energized by said rechargeable battery circuit supported below said cell means;

(b) a second assembly formed and arranged to support said first assembly and said first assembly being of sufficiently small size and weight to permit such support and in a manner enabling light from said lamp to be seen by insects sought to be trapped and including means proximate said lamp to trap insects;

(c) support means adapted to support said second assembly whereby to maintain said lamp at an elevation suited to the nature of the insects to be trapped; and (d) the surface area of said outer surface being of sufficient size to accommodate a said array of photo-voltaic cell means having sufficient charging capacity to ensure the operation of said lamp with sufficient brightness to attract said insects over a period of at least several hours of darkness.

16. A self-powered, self-contained insect trap for catching insects during hours of darkness, comprising:

(a) a first assembly having:
  (i) an outer planar surface; and (ii) a planar array of photo0voltaic cell means mounted on and substantially covering said outer planar surface;

(b) a rechargeable battery circuit including a rechargeable battery supported below said cell means and connected through leads for being powered by said cell means;

(c) a lamp connected to be and of sufficiently low power to permit being and being energized by said rechargeable battery circuit supported below said cell means;

(d) a second assembly formed and arranged to support said first assembly and said first assembly being of sufficiently small size and weight to permit such support and in a manner enabling light from said lamp to be seen by insects sought to be trapped and including means proximate said lamp to trap insects;

(e) support means adapted to support said second assembly whereby to maintain said lamp at an elevation suited to the nature of the insects to be trapped; and (f) the surface area of said outer surface being of sufficient size to accommodate a said array of photo-voltaic cell means having sufficient charging capacity to ensure the operation of said lamp with sufficient brightness to attract said insects over a period of at least several hours of darkness.

* * * * *